(12) United States Patent
Mueller et al.

(10) Patent No.: US 6,263,442 B1
(45) Date of Patent: *Jul. 17, 2001

(54) SYSTEM AND METHOD FOR SECURING A PROGRAM'S EXECUTION IN A NETWORK ENVIRONMENT

(75) Inventors: Marianne Mueller, Woodside; David Connelly, Los Altos, both of CA (US)

(73) Assignee: Sun Microsystems, Inc., Mountain View, CA (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/652,703

(22) Filed: May 30, 1996

(51) Int. Cl.⁷ ..................................................... G06F 11/30
(52) U.S. Cl. ............................................................. 713/201
(58) Field of Search ............................... 395/187.01, 186, 395/182.02, 183.14, 200.02; 364/280, 230, 280.6, 281.3, 281.7, 230.3, 286.4; 380/4, 25, 23

(56) References Cited

U.S. PATENT DOCUMENTS

| | | | | |
|---|---|---|---|---|
| 4,713,753 | * | 12/1987 | Boebert et al. ....................... | 711/164 |
| 4,780,821 | * | 10/1988 | Crossley ................................ | 395/670 |
| 4,849,877 | * | 7/1989 | Bishop et al. ................... | 395/200.56 |
| 4,891,785 | * | 1/1990 | Donohoo .......................... | 395/200.47 |
| 5,164,988 | * | 11/1992 | Matyas et al. ......................... | 380/25 |
| 5,450,567 | * | 9/1995 | Mori et al. ............................ | 395/500 |
| 5,495,533 | * | 2/1996 | Linehan et al. ........................ | 380/21 |
| 5,572,673 | * | 11/1996 | Shurts ................................... | 395/186 |
| 5,577,209 | * | 11/1996 | Boyle et al. ........................... | 713/201 |
| 5,682,514 | * | 10/1997 | Yohe et al. ............................ | 395/445 |
| 5,689,708 | * | 11/1997 | Regnier et al. ....................... | 395/682 |
| 5,699,518 | * | 12/1997 | Held et al. ....................... | 375/200.11 |
| 5,724,425 | * | 3/1998 | Chang et al. ........................... | 380/25 |
| 5,864,683 | * | 1/1999 | Boebert et al. ....................... | 709/249 |
| 5,940,591 | * | 8/1999 | Boyle et al. ........................... | 713/201 |

OTHER PUBLICATIONS

Chung, K.–M., et al., "A 'Tiny' Pascal Comiler, Part 1: The P–Code Interpreter," Byte Publications Inc. (1978), pp. 58–65, 148–155.

Chung, K.–M., et al., "A 'Tiny' Pascal Complier, Part 2: The P–Compiler," Byte Publications Inc. (1978), pp. 34–52.

Thompson, K., "Regular Expression Search Algorithm," Communication of the ACM (1968), vol. 11, No. 6, pp. 419–422.

Mitchell, J.G., et al., *Mesa Language Manual*, a Xerox Corp. document.

McDaniel, G., An Analysis of a Mesa Instruction Set (1982), a Xerox Corp. document.

Pier, A.P., A Retrospective on the Dorado, A High–Performance Personal Computer (1983), a Xerox Corp. document.

Pier, A.P., A Retrospective on the Dorado, A High–Performance Personal Computer, Conference Proceedings, The 10th Annual International Symposium on Computer Architecture, Computer Society Press (1983), pp. 252–269.

\* cited by examiner

Primary Examiner—Dieu-Minh T. Le
(74) Attorney, Agent, or Firm—Finnegan, Henderson, Farabow, Garrett & Dunner, L.L.P.

(57) ABSTRACT

A system and method for securing a program's execution in a network environment is presented. A first server is configured to permit execution of a program from a second server based on a configurable security characteristic of the program. The first server receives the program transferred from the second server. Subsequently, the program is checked for the configurable security characteristic. The program is executed on the first server if permitted by the configurable security characteristic.

26 Claims, 3 Drawing Sheets

_US 6,263,442 B1_

SYSTEM AND METHOD FOR SECURING A PROGRAM'S EXECUTION IN A NETWORK ENVIRONMENT

BACKGROUND OF THE INVENTION

This application relates to the provision of services in a client-server context. More particularly, this application relates to securing inter-server services on behalf of a client over a network.

FIG. 1 illustrates a typical client-server environment within the World Wide Web. As one of ordinary skill in the art will readily appreciate, a user's accessing a web page on the World Wide Web involves the cooperation of (at least) two pieces of software: the web browser 110, typically directly under the user's control as software on the workstation 150, and the server 120 for the web page. Responding in a manner predetermined by the author of the web page to transactions initiated by the browser 110, the server 120 typically resides on a separate processor 140.

FIG. 2 illustrates a processor 200 such as a workstation 150 or server 120. Such a processor includes a CPU 210 to which a memory 220 and I/O facilities 230 connect by a bus 240. The processor 200 connects to an external communications system 250 which is, for example, a network or modem communications link.

As the HyperText Markup Language (HTML) is the preferred language for authoring web pages, the description below is in the terms of HTML. These terms are explained in, for example, I. S. Graham, _The HTML Sourcebook_, 1996 (John Wiley & Sons, Inc., 2d Edition). Graham is incorporated herein by reference to the extent necessary to explain these terms. However, Graham is not prior art.

In addition to text and static images for display on the user's workstation 150 via the user's browser 110, a web page can also include an applet. An applet is a program included in an HTML page, whose execution a user can observe via a browser 110 enabled to recognize, download and execute the applet and to display the results of the applet's execution. The HotJava™ browser, available from the assignee of the instant invention, is the preferred browser 110, and the Java™ environment, also available from the assignee of the instant invention, is the preferred environment for encoding and executing applets.

The Java environment is described in, for example, _Java Unleashed_ (Sams.net Publishing, 1996). _Java® Unleashed_ is incorporated herein by reference to the extent necessary to explain the Java environment. However, _Java® Unleashed_ is not prior art. Java and Java-based trademarks are trademarks or registered trademarks of Sun Microsystems, Inc. in the United States and other countries.

An applet typically is a small program residing on a server 120. Some HTML document refers to the applet using the <applet> tag. When a browser downloads the HTML document and recognizes the <applet> tag, it also downloads the applet identified by the applet tag and executes that applet.

Written in a general purpose language such as Java, an applet is in this way unrestrained in its functionality. It can perform any function which a program written in any other general purpose language (such as C or PL1) can accomplish. The methodologies of applets, however, are constrained by the Java environment in order to minimize the security risks an applet presents to the workstation 150. That is to say, an applet is restricted to "play" within a bounded "sandbox."

While a security policy may suffice for the transfer of code from a server to a client, the transfer of code for execution from one server to another server presents greater security risks and requires a more stringent security policy. Accordingly, there is a need for a managing security on a server which receives code for execution.

SUMMARY OF THE INVENTION

Herein is disclosed, in a network environment, a security manager residing on a server and deciding whether to permit the execution of a servlet based on a characteristic of the servlet.

DESCRIPTION OF THE PREFERRED EMBODIMENT

Figure 1:
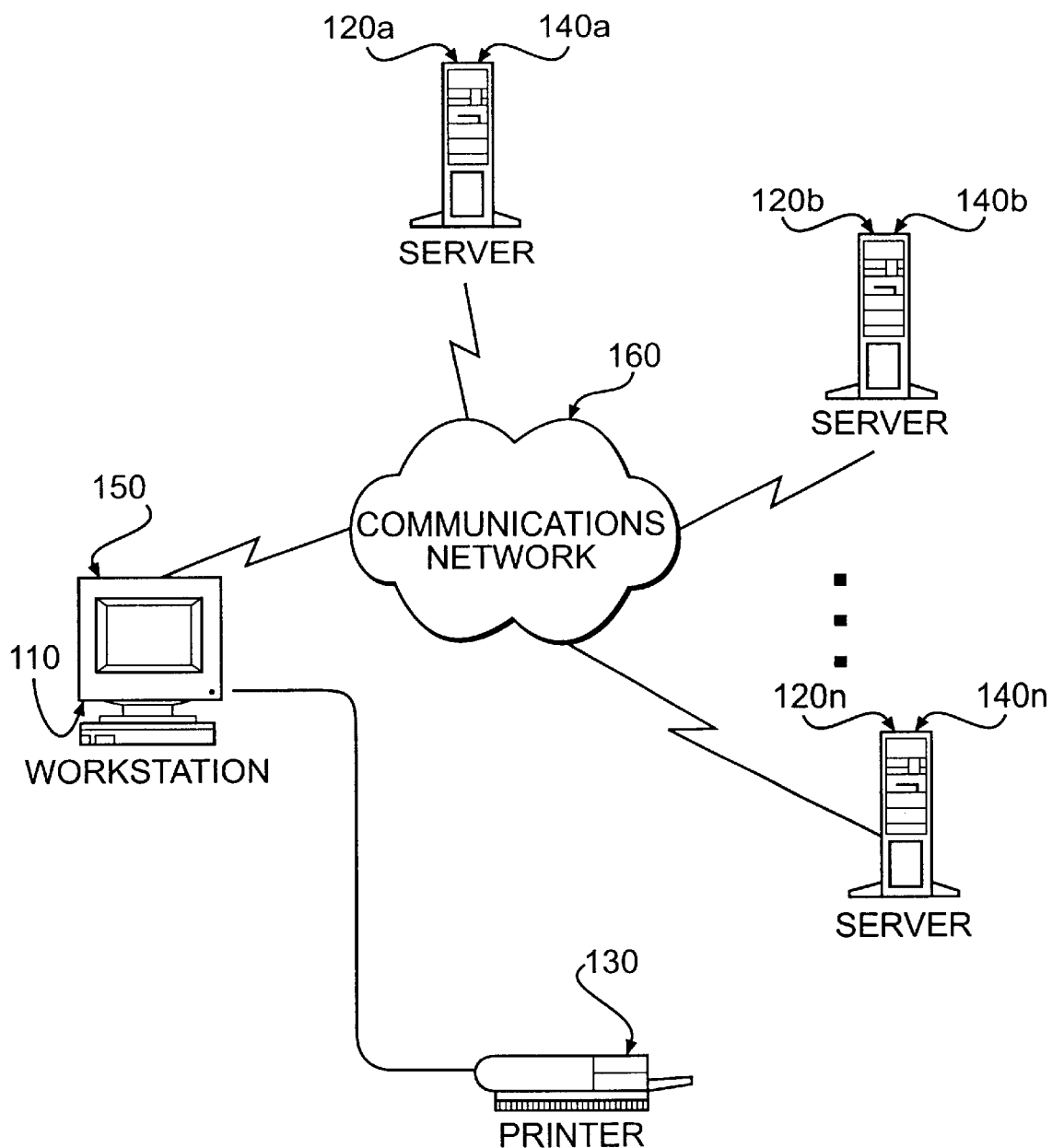
FIG. 1 illustrates a typical client-server environment within the World Wide Web.
Figure 2:
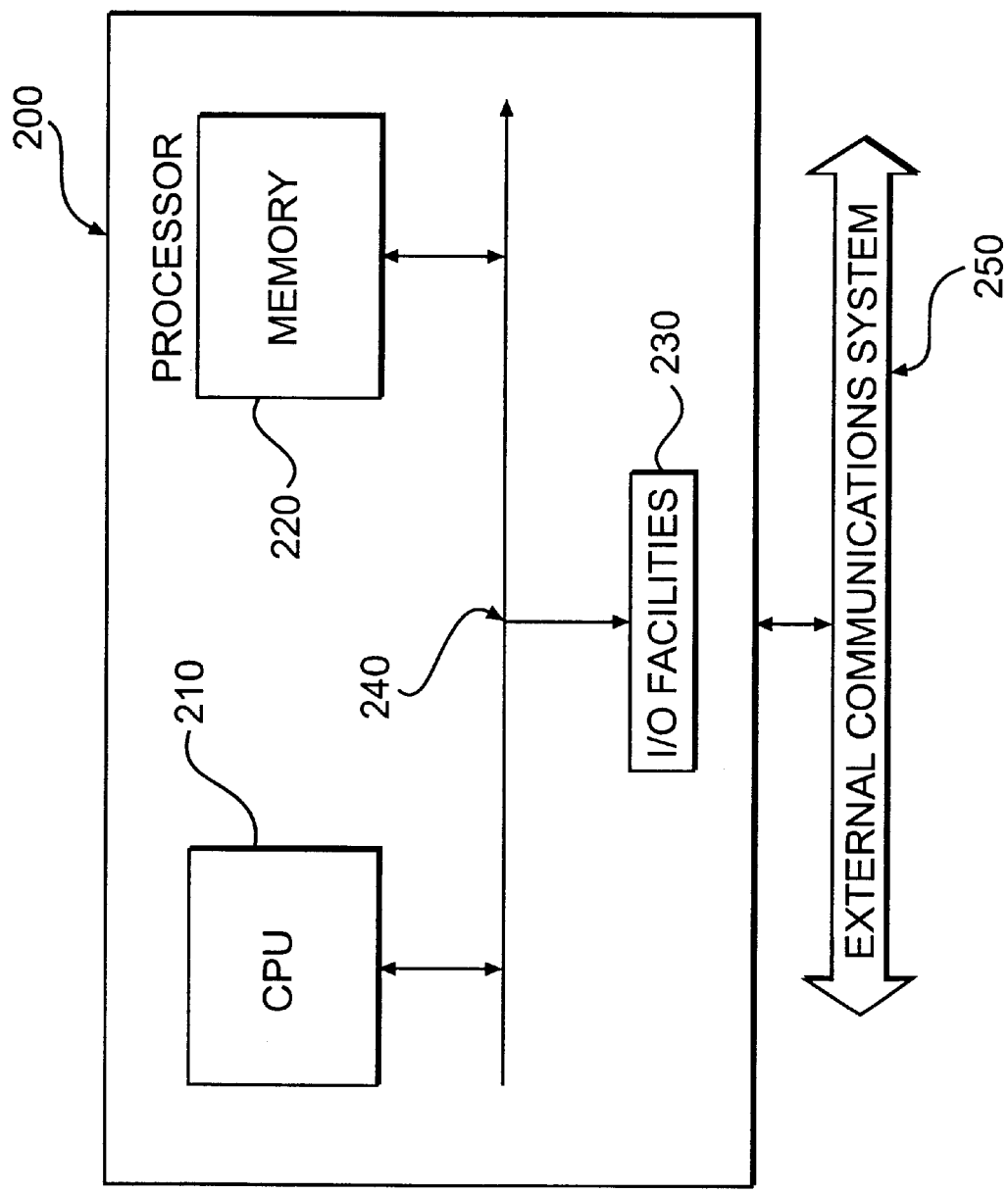
FIG. 2 illustrates a processor such as a workstation or server.

U.S. patent application Ser. No. 08/657,712 (abandoned) (filed May 30, 1996, entitled, "Method and System for Facilitating Servlets," naming as inventors Pavini P. Diwanji et al., assigned as well to the assignee of the instant patent application) describes a servlet. U.S. patent application Ser. No. 08/657,712 is incorporated herein by reference. Loosely described here, a servlet is application code transferred from a first server to a second for execution on the second server.

Because servers are typically accessed orders of magnitude more frequently than a client workstation, maintaining the integrity of the server executing a servlet becomes even more critical than maintaining the integrity of the client executing an applet. Corruption on a server can spread quite rapidly to any number of clients. Should corruption pass among servers, the rate of corruption of clients can increase exponentially. The sandbox of the servlet is appropriately restricted.

Accordingly, a server receiving a servlet over a network relies on the security aspects instantiated in the Java compiler, verifier and class loader as described generally below.

In the HotJava browser mentioned above, the boundaries of the sandbox for an applet are as follows: An applet may not read, write or inquire into the status of any filesystem on the client workstation 150. An applet from an server, say, 120_b_ running on the workstation 150 can not access any other processor 120_a_, 120_n_, 150 over the network 160 other than its server processor 120_b_. An applet cannot load a library from either its server processor 120 or the workstation 150. An applet cannot initiate the execution of a process. An applet cannot examine the properties of any resource on the workstation 150.

To assist in the enforcement of the boundaries of the sandbox of an applet, the assignee of the instant invention has developed a suite of protocols for the development and execution of applets: the Java development environment (or Java Development Kit). The development environment includes a number of packages ("lang," "io," "net," "util," "awt" and "applet"). To the extent an applet needs language, I/O, network, utility, windowing or application support, the application must resort to the methods available through the classes provided by one or some of the packages of the Java development environment.

Of course, not all classes and methods can be anticipated. As such, the Java development environment permits the construction of additional classes, methods and, ultimately, applets. However, the Java development environment includes a compiler which performs a number of checks to ensure that the applet does not contain any security violations. For example, the Java compiler does not permit pointers directly to memory. It strictly checks types. Access to an object must be through its public interface. The Java compiler leaves memory management for the Java interpreter, and the latter provides the former with no information on how it accomplishes the memory management.

A Java verifier checks the code of an applet to ensure that the security of the Java development system is intact. The verifier verifies the classfile, the type system checking, the bytecode and runtime type and access checking.

After the verifier passes the applet code, the Java class loader checks the applet code to enforce namespaces based on the network source.

Within each method of a package, the code uses the security manager to provide a system resource access control mechanism. Any time an applet needs to access a particular resource, it uses a particular pre-defined method which provides checking as to whether the applet can access that particular resource.

In addition to the security aspects instantiated in the Java compiler, verifier and class loader as described above, the receiving server invokes an improved security manager according to the invention. In addition to the security checks described above, the server's security manager identifies the network source of the servlet and implements a security policy based on the servlet's network source.

For example, the server's security manager may allow (or disallow) the execution of any servlet from a predetermined list of network sources. (In one embodiment, the authentication of the source of a servlet, particularly by digital signature, is the responsibility of the class loader.) Servlets from trusted servers identified by their digital signatures would be executed. Alternatively, the server's security manager may allow (or disallow) the execution of any unsigned servlet. As yet another alternative, the server's security manager may allow (or disallow) the execution of any signed servlet.

Another embodiment of the invention, including Java archives (JARs) is described in Table I.

TABLE I

How to sign and verify JAR files
Benefit: signature is detached from .class file; and if servlet has only one .class file, then signed JAR file is just that .class file, plus the necessary signature info
Scenario for signing JAR files:
    servlet == list of files
To sign a servlet, use standalone Java program to
    1. specify list of files
    2. specify method (CA-based or PGP-style)
    3. create JAR file, create signature, write signed JAR file
The sun.server.util.jar class library includes support for doing the signing (as well as support for packaging up the files into a JAR file.)
    1. Jar j = createJarFile (list of files)
    2. h = j .hash (algorithm)
    3. sign = h. encrypt (algorithm)
    4. SignedJARFile = createJarFile (j, sig, cert, alg)
Verifying signed servlet, within server classloader
    1. If (SignedJarFile)
        1. extract JarFile, sign, cert, alq from SignedJarFile
        2. c = JarFile.hash (algorithm) /* compute hash */
        3. pk = cert.getPublicKey ()
        4. h = sig.decrypt (algorithm)
        5. if (c == h) then /* signature is valid */
            is sig.ID on my list of trusted signatures?
            if yes, load servlet
A signed JAR file has these four fields.
The prototype uses PGP or X509 based certificate authorities.
SignedJarFile format
    * [Jar file | . class file]
    * signature
    * algorithm
    * [X509 certificate | PGP public key]

More generally, the server's security manager may decide whether to execute a servlet based on some other characteristic of the applet.

For such servlets as the server allows to execute, the server must also decide what server resources the servlet

TABLE II

| | read (filename) | | socket (host, port) |
|---|---|---|---|
| | strings immutable | access authorization | DNS name resolution |
| server 120a | Yes | Yes | Yes |
| server 120b | No | No | No |
| ... | | | |
| server 120n | Yes | No | Yes | may access. The Java environment provides a default level of service. However, the server can decide to enlarge or even shrink the default set of resources to which the servlet has access.

In one embodiment of the invention, the server maintains a configurable security policy on a group or per-server basis (as described above). The server maintains a list of configurable resources, a list of the configurable accesses possible for each resource and a cross-list of servers (or groups of servers) and the accesses they may have. Table II illustrates one such configurable security policy wherein server 120a is not trusted at all and all security checks are applied to any servlet having server 120a as its source, while server 120 is sufficiently trusted not to need access authorization for read( )'s. Servlets from server 120b are completely trusted.

In the configurable policy embodiments, the namespace of the configurable embodiments supply the methods for the security manager's checks, typically by creating a subclass of the Java environment's security manager.

In one embodiment, the security manager includes a means for notifying the system administrator of the server that a servlet desires a resource from which it is currently excluded. On notification, the system administrator may reconfigure the security policy to allow the servlet the desired access. (Whether some class of servlets may cause notification of the administrator can also be configurable.)

In another embodiment, signed servlets are completely trusted (as server 120b in Table I) and have full access to the server. Unsigned servers, however, are blocked from executing HTTP requests and responses and inter-servlet communications. Unsigned servlets do not have access to the server's file system, properties files, dynamic configuration files, or memory management facilities.

Figure 3:
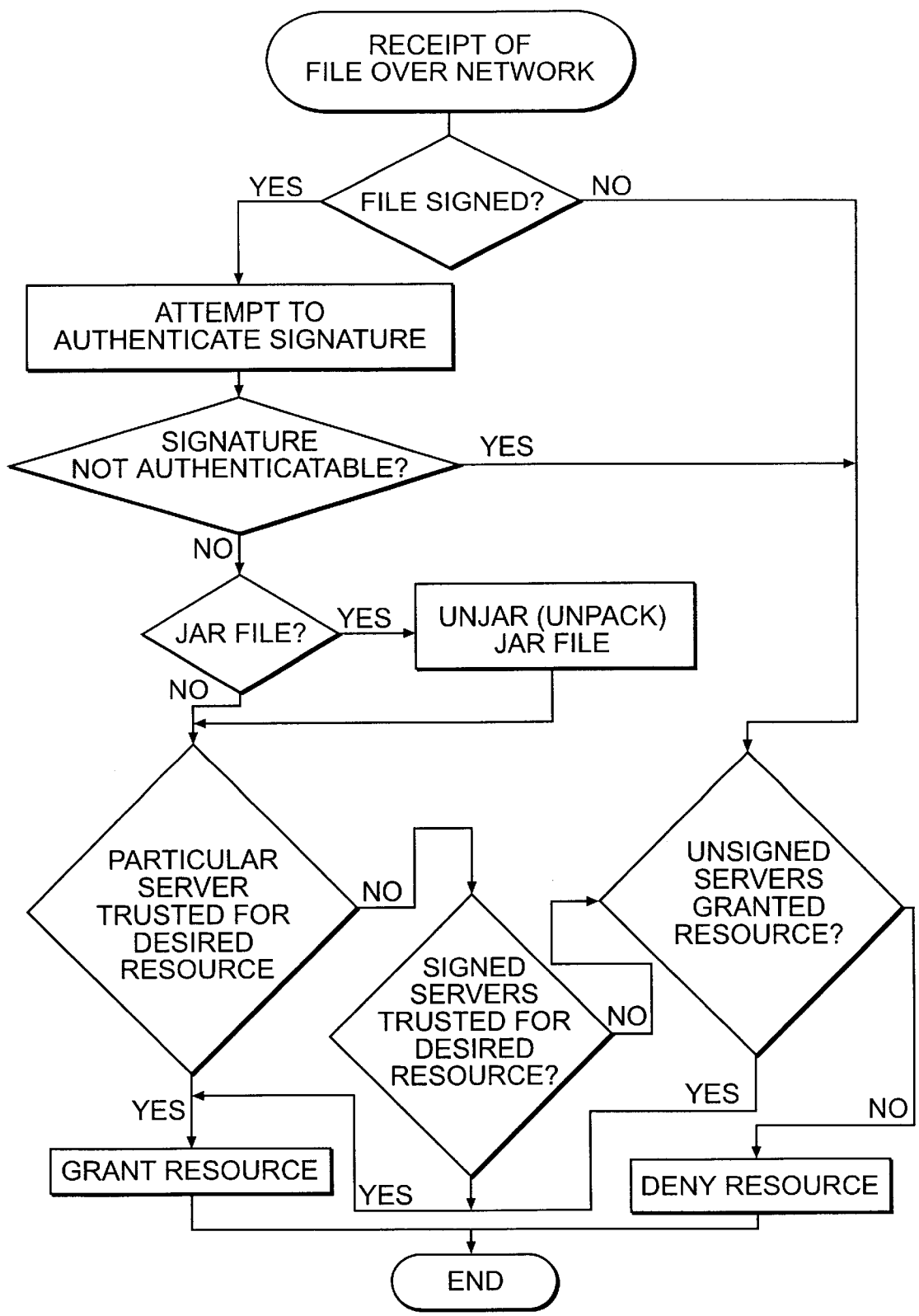
FIG. 3 is a flowchart illustrating the flow of command according to an embodiment of the invention.

FIG. 3 is a flowchart illustrating the flow of command according to an embodiment of the invention.

Of course, the client may likewise decide whether to execute application code (applet) loaded over the network based on the source or other characteristic of the applet.

Of course, the program text for such software as is herein disclosed can exist in its static form on a magnetic, optical or other disk, on magnetic tape or other medium requiring media movement for storage and/or retrieval, in ROM, in RAM, or in another data storage medium. That data storage medium may be integral to or insertable into a computer system.

What is claimed is:

1. In a client-server environment having a first server coupled to receive a program from a second server, a computer-implemented method for securing the execution of the program on said first server, said method comprising:

configuring said first server to permit execution of the program based on a configurable security characteristic of said program;

receiving at said first server said program transferred from said second server;

checking said program for said configurable security characteristic; and executing said program on said first server if permitted by said configurable security characteristic and by a configurable security policy of said first server, said configurable security policy comprising a list of configurable resources, a list of configurable accesses possible for each resource, and a cross-list of servers and the configurable accesses the servers can have.

2. The method of claim 1 wherein said step of configuring comprises:

configuring said first server to permit the execution of a program based on its network source.

3. The method of claim 2 wherein said step of checking comprises checking for a digital signature.

4. The method of claim 2 wherein said step of configuring comprises:

configuring said first server to permit the execution of a program from any of a predetermined plurality of network sources.

5. The method of claim 2 wherein said step of configuring comprises:

configuring said first server to disallow the execution of a program from any of a predetermined plurality of network sources.

6. The method of claim 2 wherein said step of configuring comprises:

configuring said first server to allow the execution of only signed programs.

7. The method of claim 2 wherein said step of configuring comprises:

configuring said first server to allow the execution of unsigned programs.

8. The method of claim 1, further comprising:

rejecting pointers directly to memory above a predetermined level of said program.

9. The method of claim 1, further comprising:

strictly checking the usage of types in said program.

10. The method of claim 1 wherein said program comprises an object having a public interface, and the method further comprising the step of:

forcing access to said object through said public interface.

11. The method of claim 1 wherein before said step of executing the following step occurs:

verifying said program for security purposes.

12. The method of claim 11 wherein said step of verifying comprises checking the format of the code of said program.

13. The method of claim 1 wherein before said step of executing the following step occurs:

ordering a plurality of classes according to the trustedness of the respective source of each class; and rejecting a requested replacement of a class with a less trusted class.

14. The method of claim 1 wherein before said step of executing the following step occurs:

ordering a plurality of classes according to the trustedness of the respective source of each class; and enforcing namespaces across said ordered plurality of classes.

15. The method of claim 1 wherein said step of executing comprises accessing a resource by means of a predetermined method that checks whether said program can access said resource.

16. The method of claim 1 wherein said step of executing comprises accessing a resource, including checking said accessing against a configurable security policy.

17. The method of claim 16 wherein said step of accessing comprises checking said accessing against a security policy configured on a per-resource basis.

18. The method of claim 16 wherein said step of accessing comprises checking said accessing against a security policy configured on a access-type-per-resource basis.

19. The method of claim 16 wherein said step of accessing comprises checking said accessing against a security policy configured to completely trust signed programs.

20. The method of claim 16 wherein said step of accessing comprises checking said accessing against a securing policy configured to block unsigned programs from executing any one of Hypertext Transfer Protocol (HTTP) requests, HTTP responses and interservlet communications.

21. An article of manufacture comprising a medium for data storage wherein is located a computer program for causing a client-server computer system having a first server coupled to receive a program from a second server to secure the execution of a program on said first server processor by:

configuring said first server to permit the execution of the program based on a configurable security characteristic of said program transferred from said second server;

checking said program for said configurable security characteristic; and executing said program on said first server if permitted by said configurable security characteristic and by a configurable security policy of said first server, said configurable security policy comprising a list of configurable resources, a list of configurable accesses possible for each resource, and a cross-list of servers and the configurable accesses the servers can have.

22. A client-server computer system, comprising:

a network;

a first server; and a second server, coupled to said first server by said network, said second server comprising a medium for data storage wherein is located a computer program for causing said second server to secure the execution of a program on said second server by:

configuring said second server to permit the execution of the program based on a configurable security characteristic of said program;

receiving said program from said first server;

checking said program for said configurable security characteristic; and executing said program on said second server if permitted by said configurable security characteristic and by a configurable security policy of said second server, said configurable security policy comprising a list of configurable resources, a list of configurable accesses possible for each resource, and a cross-list of servers and the configurable accesses the servers can have.

23. A method for securing execution of a program on a client machine, comprising:

configuring the client machine to permit execution of the program based on a configurable security characteristic of the program;

providing the program to the client machine;

determining if the program contains the configurable security characteristic; and executing the program based on the determination and based on a configurable security policy of a machine, said configurable security policy comprising a list of configurable resources, a list of configurable accesses possible for each resource, and a cross-list of machines and the configurable accesses the machines can have.

24. An article of manufacture specifying a representation of a program stored in a computer-readable storage medium and capable of execution by a machine in a distributed system, the article of manufacture comprising:

the program containing a configurable security characteristic in the computer-readable medium, the configurable security characteristic being detectable by the client machine and used by the client machine for determining whether to execute the program, wherein the client machine also executes the program based on a configurable security policy, said configurable security policy comprising a list of configurable resources, a list of configurable accesses possible for each resource, and a cross-list of machines and the configurable accesses the machines can have.

25. In a client-server environment having a first server and a second server, a computer implemented method for securing execution of a program on said first server, said method comprising the steps of:

receiving the program from the second server;

executing the program on the first server in accordance with a configurable security policy; and re-configuring the first server during execution of the program to reflect any changes to the configurable security policy determined during execution said configurable security policy comprising a list of configurable resources, a list of configurable accesses possible for each resource, and a cross-list of servers and the configurable accesses the servers can have.

26. In a client-server environment having a first server coupled to receive a program from a second server, a computer-implemented method for securing execution of a servlet based on a characteristic of the servlet, said method comprising:

receiving at said second server a servlet having a configurable security characteristic; and executing the servlet in accordance with the configurable security characteristic and a security policy associated with the second server, said configurable security policy comprising a list of configurable resources, a list of configurable accesses possible for each resource, and a cross-list of servers and the configurable accesses the servers can have.

* * * * *